March 1, 1927.
E. G. THOMAS
1,619,163
DEVICE FOR WEIGHING SHEET MATERIAL
Filed Sept. 11, 1922  2 Sheets-Sheet 1
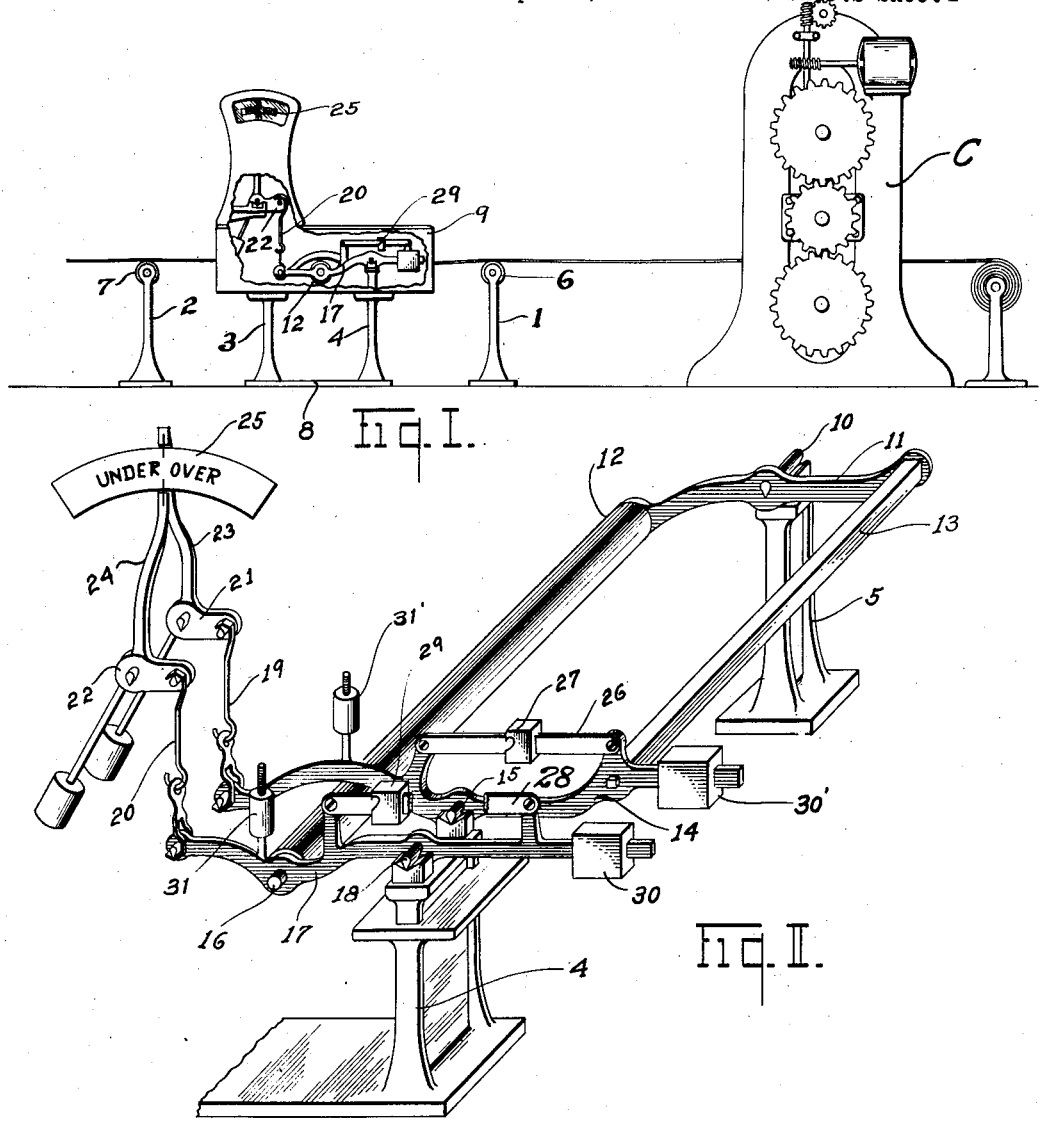
Inventor
EDWARD G. THOMAS.
By B. M. Marshall
Attorney March 1, 1927.
E. G. THOMAS
1,619,163
DEVICE FOR WEIGHING SHEET MATERIAL
Filed Sept. 11, 1922    2 Sheets-Sheet 2
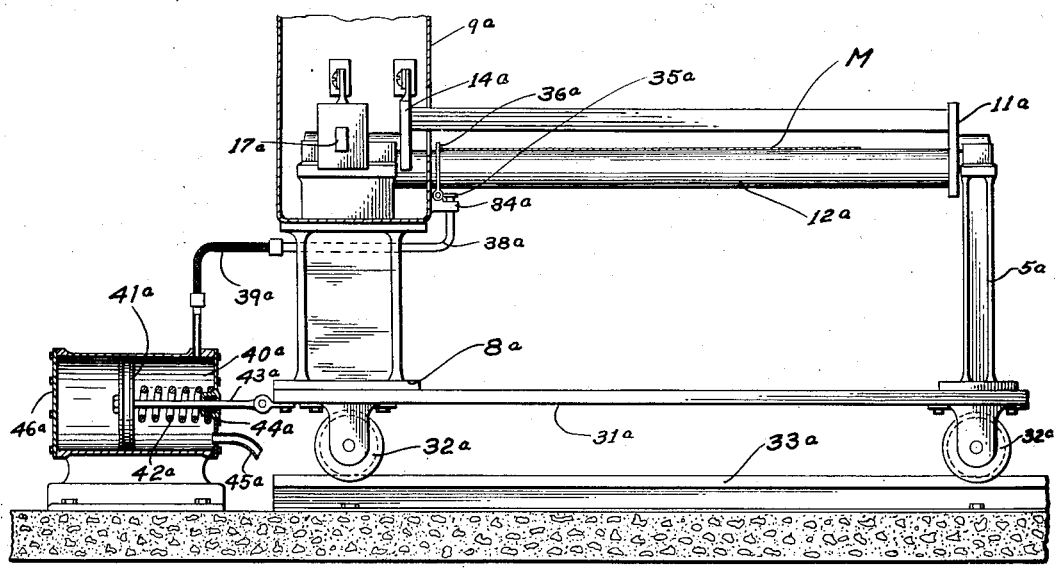
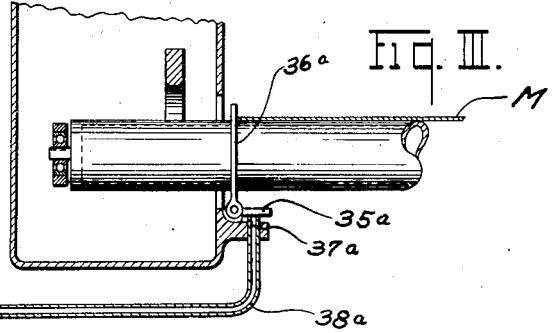
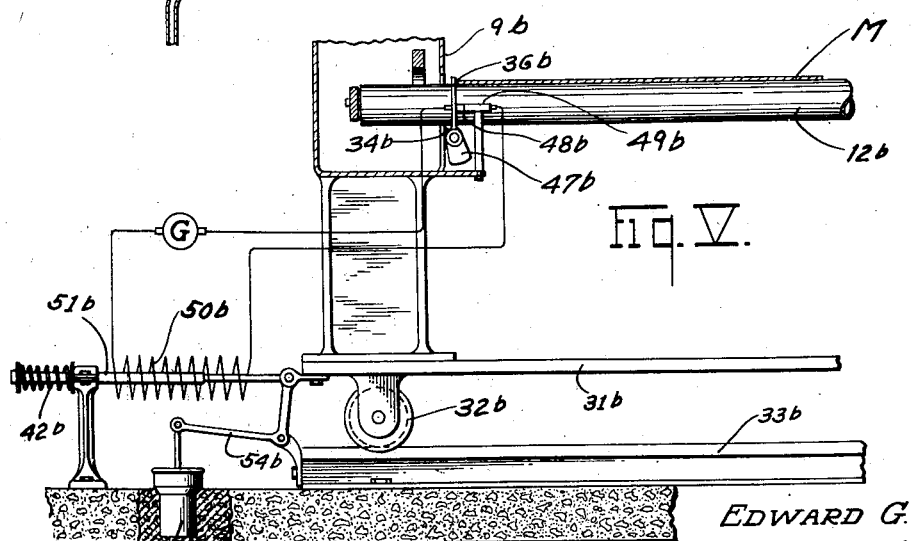
Inventor
EDWARD G. THOMAS.
By B. A. Marshall
Attorney Patented Mar. 1, 1927.

UNITED STATES PATENT OFFICE.

EDWARD G. THOMAS, OF TOLEDO, OHIO, ASSIGNOR TO TOLEDO SCALE COMPANY, OF TOLEDO, OHIO, A CORPORATION OF NEW JERSEY.

DEVICE FOR WEIGHING SHEET MATERIAL.

Application filed September 11, 1922. Serial No. 587,275.

This invention relates to devices for testing the uniformity of weight of sheet material. It is desirable that the filling and coating on coated fabrics and similar products be evenly distributed over the fabric, paper or other base to which the coating is applied, and coating machines are commonly equipped with attachments by the manipulation of which the thickness of the coating may be diminished or increased and its distribution from side to side of the sheet regulated. It is very difficult, however, to detect small variations in the weight of filling or coating per unit of length of material until a considerable length of the material has been treated and the coating is set sufficiently so that the length of material can be handled and weighed, and lack of uniformity in the application of the coating can not always be detected even by weighing a given length of the material. If, for example, the calendering machine or other device for coating the fabric be so adjusted that the coating is applied more thickly at one side of the strip than at the other, the product will be defective, but the defect can not be detected by weighing any given length of the strip of material.

One of the principal objects of this invention is the provision of a device to indicate whether or not a sheet of material varies in weight from side to side of the sheet.

Another object is to provide indicators for each side of the sheet of material, the indicators being located in juxtaposition so as to facilitate simultaneous reading and comparison.

Another object is to provide indicators for each side of the sheet of material which register with each other when the material of the sheet is uniformly distributed from side to side and which indicate variation in weight per unit of length by registration or non-registration with a fixed mark.

Another object is to provide a device for detecting variations in the weight per unit of length of a sheet of material and also variations in weight from side to side of the sheet.

Still another object is to provide means for indicating variations in weight of said material from side to side of the sheet and tracker means for maintaining the strip in proper relation to the weighing mechanism.

Other objects and advantages will be apparent from the following description, in which reference is had to the accompanying drawings illustrating preferred embodiments of my invention and wherein similar reference numerals designate similar parts throughout the several views.

In the drawings:—

Figure I is an elevational view showing a testing device embodying my invention, the device being shown as used in connection with a calendering machine, a part of the housing of the device being broken away;

Figure II is an enlarged isometric view showing the lever mechanism of the testing device, the housing and portions of the frame of the device being removed;

Figure III is an enlarged vertical sectional view showing a form of the device embodying a tracker;

Figure IV is an enlarged fragmentary sectional view showing a part of the tracker mechanism; and Figure V is an enlarged fragmentary sectional view illustrating another form of tracker mechanism.

Referring to the drawings in detail, and particularly to Figures I and II, the weighing and indicating mechanism in the illustrative embodiment shown is supported upon a plurality of standards 1, 2, 3, 4 and 5.

The standards 1 and 2 are in pairs, the pair of standards 1 supporting a roller 6, while the pair of standards 2 supports a similar roller 7.

The standards 3 and 4 are shown as supported upon a common base 8 and as supporting a housing 9 within which some of the weighing and indicating mechanism is contained.

Fulcrumed by means of a knife edge pivot 10 upon the upper end of the standard 5 is a lever 11 within one end of which is journaled the shaft of a roller 12, the connection between the roller 12 and the lever 11 being such that the shaft may turn practically without friction even when the roller 12 is slightly tilted in a vertical plane. Rigidly secured to the opposite end of the lever 11 and extending horizontally substantially parallel with the knife edge of the pivot 10 is a rigid bar 13 which is fixed at its opposite end to the end of a lever 14, the lever 14 being fulcrumed on the upper end of the standard 4 by means of a knife edge pivot 15, the knife edge of which is in alignment with that of the pivot 10 so that the lever 11, bar 13 and lever 14 are functionally integral, the frame constructed of these elements rocking as a unit on the pivots 10 and 15. The end 16 of the shaft of the roller 12 opposite to that supported by the lever 11 is supported by a lever 17 which is fulcrumed by means of a knife edge pivot 18 on the upper end of the standard 4, the bearings in which the end 16 of the roller shaft is journaled being, like those in the lever 11, of non-friction type and permitting the shaft to have rocking movement therein.

The levers 14 and 17 are respectively connected at their ends by means of links 19 and 20 to pendulums 21 and 22 having indicators 23 and 24 which co-operate with an "under" and "over" chart 25. The lever 14 is equipped with a beam 26 and poise 27, and the lever 17 is equipped with a beam 28 and poise 29, so that the weight of material carried by the roller 12 may be counterbalanced to the extent necessary to bring the indicators 23 and 24 into registration with the predetermined weight marks on the chart 25. The initial balance of the scale may be obtained by properly positioning and weighting loading boxes 30 and 30' carried by the levers 17 and 14, and the pendulum effect of the levers and parts carried thereby may be regulated by moving the weights 31 and 31' on their threaded stems.

When the device is assembled the roller 12 is preferably located substantially midway between the rollers 6 and 7 and the parts are so adjusted and arranged that when the indicators 23 and 24 are in registration with the predetermined weight marks on the chart 25, the upper surfaces of the rollers 6, 12 and 7 are tangent to the same plane. The poises 27 and 29 are moved to positions in which the portion of the strip of material supported by the roller 12 will be exactly counterbalanced with the indicators 23 and 24 in registration with the predetermined weights marks when the material is of the desired weight and the weight is evenly distributed throughout the area of the strip. The bar 13 in the form of device shown in Figures I and II lies above and out of contact with the fabric when the fabric is passed over the rollers, and its weight above the edges of the pivots 10 and 15 serves to neutralize the pendulum effect due to the weight of the roller 12, the center of mass of which is below the knife edges of the pivots 10, 15 and 18.

When the strip of fabric is drawn over the rollers 6, 12 and 7, one-half of the weight of the part of the strip which is between the rollers 6 and 7 is supported by the roller 12 so long as the upper surfaces of the rollers 6, 12 and 7 remain in the same plane, and the load sustained by the roller 12 is unaffected by the condition of tautness of the strip. Supposing the strip of material to be drawn over the rollers—while the weight on the roller 12 remains constant and its distribution from end to end of the roller 12 remains uniform, the indicators 23 and 24 will remain substantially in registration with the predetermined weight marks on the chart 25.

If filling or coating material is being fed to the fabric too rapidly, or if for any other reason the sheet "runs" heavy, both indicators will move toward the "over" side of the chart, and if for any reason the material "runs light", both indicators will move toward the "under" side of the chart. If the coating material is spread more thinly on one side of the strip than on the other, one end of the roller will support less weight than the other and the indicator connected to the end of the roller over which the material is running light will move toward the "under" side of the chart, while the indicator connected to the roller over which the material is running heavy will move toward the "over" side of the chart. Variation in weight from side to side is thus indicated by movement of the indicators 23 and 24 relative to each other, while variation in weight per unit of length is indicated by movement of the indicators relative to the chart 25. Since the non-uniformity in weight of the sheet or strip is at once indicated, the machine from which the strip is being drawn may be quickly adjusted to deliver the product in proper condition when the indicators will register with each other and with the predetermined weight mark on the stationary chart 25.

The calender C is shown in Figure I merely to better illustrate the purpose of the machine, and forms no part of the present invention.

In some conditions of use it is very difficult to prevent the strip from running slightly toward one end or the other of the roller 12, and when such lateral movement occurs the load on the end of the roller 12 toward which the strip has shifted is increased, while the load on the other end of the roller is decreased. The effect on the indicators is, therefore, the same as though the weight of the strip from side to side were non-uniform. In the forms illustrated in Figures III, IV and V means are provided for rectifying such errors.

In the form of device shown in Figure III, the base 8$^a$ with its stand and the stand 5$^a$ are mounted upon a truck 31$^a$ having flanged wheels 32$^a$ adapted to roll upon rails 33$^a$ which are fixed to the floor. The levers 11$^a$, 14$^a$ and 17$^a$, with the roller 12$^a$ and the other parts connected to the levers, are mounted substantially in the same manner as the corresponding parts in the form of device shown in Figures I and II. Attached to the housing $9^a$ is a bracket $34^a$ to which is pivoted a vane $35^a$ having a finger $36^a$ extending upwardly at the edge of the sheet of material M. The vane $35^a$ normally almost closes a small orifice $37^a$ in a pipe $38^a$ which is connected by means of a flexible hose $39^a$ to a cylinder $40^a$. Within the cylinder $40^a$ is a piston $41^a$ which is urged toward one end of the cylinder by an expansive spring $42^a$ and which is connected by means of a piston rod $43^a$ that passes through a stuffing box in the cylinder head $44^a$ to the truck $31^a$. The space between the piston $41^a$ and the piston head $44^a$ is kept in a state of partial vacuum by means of a vacuum pump or similar device (not shown) connected to a pipe $45^a$. The opposite end of the cylinder may be open to the atmosphere or closed by means of a cylinder head $46^a$, as shown. If open to the atmosphere, the piston is urged in opposite directions by atmospheric pressure and the expansive spring $42^a$, and if the end of the cylinder be closed, as shown, the piston is urged in one direction by the pressure of the air confined between the piston and the cylinder head and in the opposite direction by the expansive spring $42^a$.

Should the strip of material passing over the roller $12^a$ shift toward the end of the roller supported by the lever $17^a$, the weight on the lever $17^a$ would be increased and the weight on the levers $11^a$ and $14^a$ decreased, even though the sheet material were absolutely uniform in weight throughout its area. When, however, the device is equipped as shown in Figures III and IV, the slightest shifting of the sheet material toward the end of the roller supported by the lever $17^a$ lifts the vane $35^a$ and permits an increased flow of air into the cylinder $40^a$ which exerts pressure on the piston $41^a$ and assists the spring $42^a$ to move the piston $41^a$, the truck $31^a$ and hence the roller $12^a$ in the same direction in which the material has shifted until the roller and material are again brought into proper relative positions. Should the fabric shift to the right and thus move out of contact with the finger $36^a$, the vane $35^a$ will immediately entirely close the opening in the end of the pipe $38^a$ and the partial vacuum in the cylinder $40^a$ will become more complete, thus allowing the piston $41^a$, the truck $31^a$ and the roller $12^a$ to be moved laterally of the strip of fabric until the finger $36^a$ again comes into contact with the edge of the material and air is again permitted to pass under the vane $35^a$, the roller and fabric being thus brought into proper relative positions.

In the form shown in Figure V, the testing mechanism is supported upon a truck $31^b$ having wheels $32^b$ which roll on rails $33^b$ similar to those employed in the form shown in Figure III. The truck is, however, moved by means of a solenoid and spring instead of a pneumatic device and spring. Mounted upon the housing $9^b$ is a bracket $34^b$ to which is pivoted a finger $36^b$ adapted to contact with the edge of the material M as it passes over the roller $12^b$. The finger $36^b$ is provided with a weight $47^b$ adapted to hold the finger $36^b$ in substantially upright position. The finger is electrically connected to one pole of the source of current G and carries a contact $48^b$ adapted, when the finger is in substantially upright position, to engage a contact $49^b$ which is supported by the housing $9^b$ and is electrically connected to a solenoid $50^b$ which is in turn connected to the other pole of the source of current G. The core $51^b$ of the solenoid is urged in one direction by an expansive spring $42^b$ and is urged in the opposite direction when the contacts $48^b$ and $49^b$ are in engagement with the solenoid $50^b$. In order to prevent spasmodic movement of the truck $30^b$ and the mechanism carried thereby, the dash pot $53^b$ is mounted adjacent the truck and connected thereto by means of a bell crank lever $54^b$.

In the operation of this form of the device, if the material M shifts to the left, the finger $36^b$ is rocked on its pivot and the contacts $48^b$ and $49^b$ separated, thereby de-energizing the solenoid $50^b$, so that the solenoid core $51^b$, the truck $31^b$ and the roller $12^b$ move to the left under the influence of the spring $42^b$ until the contacts $48^b$ and $49^b$ are again engaged and the action of the solenoid $50^b$ is set up against the tension of the spring $42^b$. In practice the shifting movement of the material M and the consequent movement of the truck and roller $12^b$ are very small. The slight changes in the relative positions of the material and the roller $12^b$ are so promptly corrected that erroneous indications on the predetermined weight chart are prevented.

While it will be apparent that the illustrated embodiments of my invention herein disclosed are well calculated to adequately fulfill the objects primarily stated, it is to be understood that the invention is susceptible to variation, modification and change within the spirit and scope of the subjoined claims.

Having described my invention, I claim:

1. In a device of the class described, in combination, means for supporting a portion of a moving strip of material, and means connected to said supporting means for indicating the variations in weight per unit of length of said strip and for indicating variations in the weight from side to side of said strip, said means comprising a pair of movable indicators and a fixed chart, said indicators being adapted to indicate uniformity or non-uniformity in weight per unit of length of the strip by registration or non-registration with a predetermined mark on the fixed chart and uniformity or non-uniformity of weight from side to side of said strip by registration or non-registration with each other.

2. In a device of the class described, in combination, a member adapted to extend transversely of and support a longitudinally moving strip of material, a means supporting each end of each of said transversely extending member, and means connected to said supporting means for indicating variations in the weight carried thereby, said indicating means being located in juxtaposition to facilitate simultaneous reading and comparison.

3. In a device of the class described, in combination, a roller adapted to extend transversely of and support a longitudinally moving strip of material, a means supporting each end of each of said transversely extending roller, and means connected to said supporting means for indicating variations in the weight carried thereby, said indicating means being located in juxtaposition to facilitate simultaneous reading and comparison.

4. In a device of the class described, in combination, a member adapted to extend transversely of and support a longitudinally moving strip of material, a means supporting each end of said transversely extending member, and means connected to said supporting means for indicating variations in the weight carried thereby, said indicating means comprising a fixed chart and a pair of movable indicators, each of which is connected to one of said supporting means, the indicators and chart being so arranged that the indicators indicate uniformity or non-uniformity in weight of the strip from side to side by registration or non-registration with each other and indicate variations in weight per unit of length by their condition of registration with markings on the chart.

5. In a device of the class described, in combination, a member adapted to support a portion of a moving strip of material, means for supporting said member at two places located in a line extending transversely to the direction of motion of the strip, indicating means for indicating the weight carried by one of said supports, indicating means for indicating the weight carried by the other of said supports, said indicating means comprising two movable indicators and a fixed chart, the indicators and chart being so arranged that the distribution of weight in the fabric is indicated by registration of the indicators with aligned markings on the chart.

6. In a device of the class described, in combination, a member adapted to support a portion of a moving strip of flexible material, means for supporting said member at two places, said places being located at opposite sides of the strip of material respectively, indicating means for indicating the weight carried by one of said supports, indicating means for indicating the weight carried by the other of said supports, said indicating means comprising two movable indicators and a fixed chart, the indicators and chart being so arranged that the distribution of weight in the fabric is indicated by registration of the indicators with aligned markings on the chart.

7. In a device of the class described, in combination, a member adapted to support a portion of a moving strip of flexible material, levers for supporting said member at two places, one of said points being located at one side of said strip, the other of said points being located at the other side of said strip, and indicating means for indicating variations in the weight carried by each of said levers, said indicating means being located in juxtaposition to facilitate simultaneous reading and comparison.

8. In a device of the class described, in combination, a roller adapted to extend transversely of and support a portion of a longitudinally moving strip of flexible material, a lever supporting each end of said roller, and counterforce means and indicators connected to said levers, said indicators being located in juxtaposition to facilitate simultaneous reading and comparison.

9. In a device of the class described, in combination, a roller adapted to extend transversely of and support a portion of a longitudinally moving strip of flexible material, a lever supporting one end of said roller, a lever supporting the other end of said roller, a lever rigidly connected to the second said lever and located in juxtaposition to the first said lever, and indicators connected respectively to the first said lever and the third said lever.

10. In a device of the class described, in combination, a member adapted to extend transversely of and support a portion of a longitudinally moving strip of flexible material, means connected to said transversely extending member for indicating variations in weight from side to side of said strip of material, and means for maintaining said strip and said member in approximately the same relative position transversely of said strip.

11. In a device for detecting variations in weight from side to side of a moving strip of material, a roller adapted to extend transversely of such strip and support a portion thereof, means supporting the ends of said roller and adapted to indicate variations in the weight carried thereby and variations in the distribution of weight from side to side thereof, and means adapted to maintain said strip and said roller in approximately the same relative position transversely of said strip.

12. In a device for detecting variations in weight from side to side of a moving strip of material, a roller adapted to extend transversely of such strip and support a portion thereof, means supporting the ends of said roller and adapted to indicate variations in the weight carried thereby and variations in the distribution of weight from side to side thereof, and means adapted to maintain said strip and said roller in approximately the same relative position transversely of said strip, the last said means comprising mechanism adapted to move said roller and its supports transversely of said strip, and controlling means for said device adapted to be actuated upon transverse shifting of said strip.

13. In a device for detecting variations in weight from side to side of a moving strip of material, a roller adapted to extend transversely of such strip and support a portion thereof, means supporting the ends of said roller and adapted to indicate variations in the weight carried thereby and variations in the distribution of weight from side to side thereof, and means adapted to maintain said strip and said roller in approximately the same relative position transversely of said strip, the last said means comprising mechanism adapted to move said roller and its supports transversely of said strip, and controlling means for said device adapted to be actuated upon transverse shifting of said strip, said controlling means including a member adapted to engage one edge of said moving strip of material.

EDWARD G. THOMAS.